(12) United States Patent
Kaneko et al.

(10) Patent No.: US 12,428,531 B2
(45) Date of Patent: Sep. 30, 2025

(54) POLYESTER-BASED SHRINK FILM

(71) Applicants: C.I. TAKIRON Corporation, Osaka (JP); Bonset America Corporation, Browns Summit, NC (US); Bonset Latin America S.A., Barros Blancos Canelones (UY)

(72) Inventors: Takuma Kaneko, Osaka (JP); Yuichiro Kanzaka, Osaka (JP); Shuuta Yuge, Osaka (JP); Tatsuya Irifune, Osaka (JP); Masanao Miyoshi, Osaka (JP)

(73) Assignees: C.I. Takiron Corporation, Osaka (JP); Bonset America Corporation, Browns Summit, NC (US)

( * ) Notice: Subject to any disclaimer, the term of this patent is extended or adjusted under 35 U.S.C. 154(b) by 312 days.

(21) Appl. No.: 17/921,167

(22) PCT Filed: Apr. 30, 2020

(86) PCT No.: PCT/JP2020/018280
§ 371 (c)(1),
(2) Date: Oct. 25, 2022

(87) PCT Pub. No.: WO2021/220468
PCT Pub. Date: Nov. 4, 2021

(65) Prior Publication Data
US 2023/0183434 A1    Jun. 15, 2023

(51) Int. Cl.
*C08J 5/18*     (2006.01)
*C08L 67/02*    (2006.01)
(Continued)

(52) U.S. Cl.
CPC ............ *C08J 5/18* (2013.01); *C08L 67/02* (2013.01); *B29C 61/02* (2013.01);
(Continued)

(58) Field of Classification Search
None
See application file for complete search history.

(56) References Cited

U.S. PATENT DOCUMENTS 4,963,418 A * 10/1990 Isaka .......................... C08J 5/18
528/304
2002/0186120 A1* 12/2002 Tamura ...................... C08J 5/18
338/22 R
(Continued)

FOREIGN PATENT DOCUMENTS

CN    101484317 A    7/2009
CN    101970212 A    2/2011
(Continued)

OTHER PUBLICATIONS

Machine Translation of JP-2006045317-A, Feb. 2006 (Year: 2006).*
(Continued)

*Primary Examiner* — Jeffrey A Vonch
(74) *Attorney, Agent, or Firm* — Renner, Kenner; Arthur M. Reginelli

(57) ABSTRACT

Provided is a polyester-based shrink film having excellent predetermined impact resistance and having a uniform shrinkage ratio near the shrinking temperature.

20 Claims, 8 Drawing Sheets

(51) Int. Cl.
  *B29C 61/02* (2006.01)
  *B29K 67/00* (2006.01)
  *B29K 105/02* (2006.01)
  *B65D 75/00* (2006.01)

(52) U.S. Cl.
  CPC .... *B29K 2067/003* (2013.01); *B29K 2105/02* (2013.01); *B65D 75/002* (2013.01); *C08J 2367/00* (2013.01); *C08J 2367/02* (2013.01); *C08J 2467/02* (2013.01); *C08L 2203/162* (2013.01); *C08L 2205/025* (2013.01)

(56) References Cited

U.S. PATENT DOCUMENTS

| | | | | |
|---|---|---|---|---|
| 2005/0196563 | A1* | 9/2005 | Ito | C08J 5/18 428/34.1 |
| 2009/0270584 | A1* | 10/2009 | Endo | B29C 61/06 528/308.1 |
| 2009/0304997 | A1* | 12/2009 | Haruta | B29C 55/065 428/156 |
| 2010/0247845 | A1* | 9/2010 | Haruta | B29C 55/143 528/308.1 |
| 2010/0260951 | A1* | 10/2010 | Haruta | G09F 3/04 428/35.1 |
| 2011/0008607 | A1* | 1/2011 | Haruta | B29C 55/14 428/500 |
| 2011/0065893 | A1 | 3/2011 | Oh et al. | |
| 2011/0143123 | A1 | 6/2011 | Ito et al. | |
| 2011/0224369 | A1 | 9/2011 | Kim et al. | |
| 2012/0196980 | A1* | 8/2012 | Kliesch | B29C 48/08 528/298 |
| 2013/0011587 | A1 | 1/2013 | Kim et al. | |
| 2013/0095371 | A1* | 4/2013 | Zaikov | B32B 27/08 428/354 |
| 2015/0175756 | A1 | 6/2015 | Haruta et al. | |
| 2016/0137833 | A1* | 5/2016 | Haruta | B29C 55/14 206/459.5 |
| 2018/0043607 | A1* | 2/2018 | Haruta | B29C 55/02 |
| 2018/0208375 | A1* | 7/2018 | Haruta | B29C 55/14 |
| 2018/0229422 | A1* | 8/2018 | Inoue | B65D 75/02 |
| 2018/0319539 | A1* | 11/2018 | Haruta | B32B 27/08 |
| 2019/0169386 | A1* | 6/2019 | Inoue | C08L 67/02 |
| 2019/0211167 | A1* | 7/2019 | Peters | C08G 63/181 |
| 2019/0375552 | A1* | 12/2019 | Haruta | B65D 25/205 |
| 2021/0108027 | A1* | 4/2021 | Minami | C08G 63/183 |
| 2021/0214583 | A1 | 7/2021 | Kaneko | |
| 2022/0049049 | A1* | 2/2022 | Nakagawa | C08G 63/183 |

FOREIGN PATENT DOCUMENTS

| | | | | |
|---|---|---|---|---|
| EP | 1894964 | A1 * | 3/2008 | C08J 5/18 |
| JP | 06122152 | A * | 5/1994 | |
| JP | 07188400 | A * | 7/1995 | |
| JP | 2001247688 | A * | 9/2001 | |
| JP | 2002212405 | A * | 7/2002 | |
| JP | 2003071926 | A * | 3/2003 | |
| JP | 2003313318 | A * | 11/2003 | |
| JP | 3482743 | B | 1/2004 | |
| JP | 2004018804 | A * | 1/2004 | |
| JP | 2006045317 | A * | 2/2006 | |
| JP | 2007-056156 | A | 3/2007 | |
| JP | 2007152943 | A * | 6/2007 | |
| JP | 2007217554 | A * | 8/2007 | |
| JP | 2008-239999 | A | 10/2008 | |
| JP | 2008230225 | A * | 10/2008 | |
| JP | 2008273625 | A * | 11/2008 | |
| JP | 2008274160 | A * | 11/2008 | |
| JP | 2009237561 | A * | 10/2009 | |
| JP | 2010000799 | A | 1/2010 | |
| JP | 2010-149521 | A | 7/2010 | |
| JP | 2011-126247 | A | 6/2011 | |
| JP | 2011-521050 | A | 7/2011 | |
| JP | 2011-184690 | A | 9/2011 | |
| JP | 2011-524921 | A | 9/2011 | |
| JP | 2012036272 | A * | 2/2012 | |
| JP | 2012036273 | A * | 2/2012 | |
| JP | 2014012379 | A * | 1/2014 | |
| JP | 2015-199963 | A | 11/2015 | |
| JP | 2015199337 | A * | 11/2015 | |
| JP | 2017030319 | A * | 2/2017 | |
| JP | 2017213887 | A * | 12/2017 | |
| WO | 2009/151290 | A2 | 12/2009 | |
| WO | 2014/021120 | A1 | 7/2016 | |
| WO | 2017/022703 | A1 | 2/2017 | |
| WO | 2019230843 | A1 | 12/2019 | |

OTHER PUBLICATIONS

Machine Translation of JP-2012036273-A, Feb. 2012 (Year: 2012).*
C.I. Takiron Corporation—Written Statement Submitted Sep. 23, 2020 re PCT/JP2020/018280 to Commissioner of Patents (17 pp).

* cited by examiner

POLYESTER-BASED SHRINK FILM

TECHNICAL FIELD

The present invention relates to a polyester-based shrink film.

More particularly, the invention relates to a polyester-based shrink film having excellent impact resistance and having a uniform shrinkage ratio near the shrinking temperature.

BACKGROUND ART

Conventionally, polyethylene-based resins, polypropylene-based resins, polyvinyl chloride-based resins, polyester resins, and the like have been used as main components of shrink films in order to exert a labeling effect and a decorative effect in various containers such as PET bottles.

Furthermore, from the viewpoint of being a general-purpose product that is inexpensive and easily disposed of, a polyolefin-based shrink film including a polyethylene resin, a polypropylene resin, or the like as a main component is preferably used (see, for example, Patent Document 1).

More specifically, the polyolefin-based shrink film is a polyolefin-based multilayer shrink film obtained by subjecting a multilayer configuration having at least three or more layers including both surface layers including a propylene-based resin and an internal layer including a crystalline propylene resin polymerized by a metallocene catalyst or an ethylene-based resin, to biaxial stretching processing under the stretching conditions with an area stretch ratio of 20 or more times such that the lateral factor of the stretch ratio is larger than the longitudinal factor, the multilayer shrink film satisfying all of the following conditions (a) to (e):
  (a) the thickness is in the range of 6 to 11 µm;
  (b) the tensile modulus is 0.8 GPa or greater;
  (c) the thermal shrinkage ratio at 120° C. is 35% or higher;
  (d) the shrinkage ratio after storage for 7 days in an atmosphere at 40° C. is 4% or less; and
  (e) the tear strength is 30 mN or greater.

Furthermore, a polyester-based shrink film having high transparency, excellent impact resistance and low-temperature shrinkability, and having biodegradability has been proposed (see, for example, Patent Document 2).

That is, the polyester-based shrink film is a shrink film formed from a lactic acid-based polymer having a weight average molecular weight of 10000 to 700000, which includes a structural unit obtained by dehydration condensation of lactic acid; and a polyester structural unit obtained by dehydration condensation of a dicarboxylic acid and a diol and/or a polyether polyester structural unit obtained by dehydration condensation of a dicarboxylic acid and a polyether polyol.

Furthermore, the polyester-based shrink film is a polyester-based shrink film having a thickness of 10 to 120 µm, a 1% shrinkage initiation temperature of 35° C. to 80° C., an impact resistance strength of 6 kgf·cm or greater as measured in a film impact test of the film, and a maximum shrinkage ratio in the stretching direction of 35% to 90%.

CITATION LIST

Patent Document

Patent Document 1: JP 2011-126247 A (claims and the like)
Patent Document 2: JP 3482743 B2 (claims and the like)

SUMMARY OF THE INVENTION

Problem to be Solved by the Invention

However, although the polyolefin-based shrink film described in Patent Document 1 has a multilayer structure, the polyolefin-based shrink film has defects such as a small value of elastic modulus, low heat resistance, and relatively insufficient transparency.

Therefore, there are problems in view of manufacturing that the high-speed automatic packaging suitability and printing suitability are inferior, and that due to a decrease in the tear strength, ripping is likely to occur from an air vent pinhole provided by an automatic packaging machine.

Furthermore, with regard to the polyester-based shrink film including a structural unit obtained by dehydration condensation of lactic acid as described in Patent Document 2, there is seen a problem that the production cost is high and it is economically disadvantageous, because a special polyester resin is used and the like.

Furthermore, such a shrink film including a lactic acid-derived structural unit has low mechanical strength and high water absorbability, and therefore, there is seen a problem that the shrinkage ratio exhibits a large variation due to the differences in the shrinking temperature and crystallinity. Particularly, in relation to the water absorbability, there is seen a problem that the shrinkage ratio at a temperature near the shrinking temperature at about 100° C. exhibits a large variation.

In addition, conventional shrink films include the polyester-based shrink film including a structural unit obtained by dehydration and condensation of lactic acid as described in Patent Document 2, and no consideration was given to suitable ranges of the impact resistance strength before shrinkage, the impact resistance strength after shrinkage, the shrinkage ratio near the shrinking temperature, and the like.

Therefore, conventional shrink films have inferior impact resistance, and thus there is seen a problem that only a shrink film having a large variation in the shrinkability near the shrinking temperature can be obtained.

Thus, the inventors of the invention found that in a case where a lactic acid-derived structural unit is substantially not included, a shrink film that shrinks uniformly and stably is obtained by limiting the predetermined impact resistance strength to a value within a predetermined range and limiting the ratio of the shrinkage ratio near the shrinking temperature, and the like, thus completing the invention.

That is, it is an object of the invention to provide a shrink film and the like having excellent impact resistance and having excellent uniformity and stability of the shrinkage ratio near the shrinking temperature.

Means for Solving Problem

According to the invention, there is provided a polyester-based shrink film derived from a polyester resin, the polyester-based shrink film satisfying the following configurations (a) to (c), and thus the above-described problems can be solved.
  (a) The impact resistance strength before shrinking, which is measured by a pendulum-type film impact tester, is designated as A1, and this is set to a value within the range of 20 to 60 J/mm.
  (b) When the impact resistance strength measured by a pendulum-type film impact tester after having been shrunk by 10% in hot water at 80° C. is designated as A2, a numerical value represented by A2/A1×100 in the relationship with A1 is set to a value within the range of 60% to 110%.

(c) When the shrinkage ratio in the case of having been shrunk under the conditions of 10 seconds in hot water at 80° C. is designated as B1, and the shrinkage ratio in the case of having been shrunk under the conditions of 10 seconds in hot water at 90° C. is designated as B2, a numerical value represented by B1/B2×100 is set to a value within the range of 70% to 90%.

That is, by satisfying the configuration (a), satisfactory impact resistance strength, which is a numerical value in a predetermined range as measured by means of a pendulum-type film impact tester, can be obtained for a polyester-based shrink film before shrinking.

Furthermore, by satisfying the configuration (b), even when the values of impact resistance strength of A1 and A2 slightly vary, a satisfactory predetermined ratio (A2/A1×100) derived from impact resistance strength A1 and A2 can be obtained for a polyester-based shrink film that has been shrunk under predetermined conditions, by reducing predetermined influencing factors.

Moreover, by satisfying the configuration (c), even when the values of A1 and A2 of the impact resistance strength of the configuration (a) and configuration (b) slightly vary, a predetermined ratio (B1/B2×100) derived from stable and uniform shrinkage ratios can be obtained near the shrinking temperature (for example, 80° C. to 90° C.; hereinafter, the same) of a polyester-based shrink film, by reducing predetermined influencing factors.

Therefore, by limiting each of (A2/A1×100) and (B1/B2×100) to a value within a predetermined range as such, a shrink film having excellent impact resistance and having excellent uniformity and stability in the shrinkage ratio near the shrinking temperature can be provided.

In addition, as will be described below, satisfactory results can be obtained in a predetermined drop test.

Furthermore, upon configuring the invention, it is preferable that A2 of the impact resistance strength is set to a value within the range of 20 to 45 J/mm.

By specifically limiting A2 of the impact resistance strength to a value within a predetermined range as such, the numerical value represented by A2/A1×100 is likely to be controlled to a value within a predetermined range.

Furthermore, upon configuring the invention, it is preferable to set B1 of the shrinkage ratio to a value within the range of 35% to 80%, and B2 of the shrinkage ratio to a value within the range of 40% to 85%.

By specifically limiting each of B1 of the shrinkage ratio and B2 of the shrinkage ratio to a value within a predetermined range as such, the numerical value represented by B1/B2×100 is likely to be controlled to a value within a predetermined range.

Furthermore, upon configuring the invention, it is preferable to set the film thickness before shrinking to a value within the range of 10 to 100 μm.

By specifically limiting the film thickness before shrinking to a value within a predetermined range as such, each of the numerical value represented by A2/A1×100, the numerical value represented by B1/B2×100, and the like is likely to be controlled more easily to a value within a predetermined range.

Furthermore, upon configuring the invention, it is preferable to set the stretch ratio in the MD direction of the film before shrinking to a value within the range of 100% to 200%.

By specifically limiting the stretch ratio in the MD direction of the film before shrinking to a value within a predetermined ratio as such, each of the numerical value represented by A2/A1×100, the numerical value represented by B1/B2×100, and the like is likely to be controlled more easily and quantitatively to a value within a predetermined ratio.

Furthermore, upon configuring the invention, it is preferable that the stretch ratio in the TD direction of the film before shrinking is set to a value within the range of 300% to 600%.

By specifically limiting the stretch ratios in the MD direction as well as the TD direction of the film before shrinking to values within predetermined ranges as such, each of the numerical value represented by A2/A1×100, the numerical value represented by B1/B2×100, and the like is likely to be controlled more easily and quantitatively to a value within a predetermined range.

Furthermore, upon configuring the invention, it is preferable that the haze value of the film before shrinking as measured according to JIS K 7105 is set to a value of 5% or less.

By specifically limiting the haze value to a value within a predetermined range as such, transparency of the polyester-based shrink film is also likely to be controlled quantitatively.

Furthermore, upon configuring the invention, it is preferable to set the content of a non-crystalline polyester resin to a value within the range of 90% to 100% by weight of the total amount of resins.

By specifically limiting the content of a non-crystalline polyester resin as such, the impact resistance strength and the shrinkage ratio near the shrinkage temperature can be adjusted more easily to desired ranges, and the haze value and the like are also likely to be controlled quantitatively.

Incidentally, the residual amount of the non-crystalline polyester resin in the total amount of resins is a value contributed by a crystalline polyester resin and a resin other than a polyester resin.

MODE(S) FOR CARRYING OUT THE INVENTION

First Embodiment

Figure 1A:
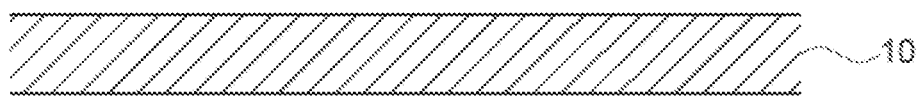
FIGS. 1A to 1C are diagrams for describing each of different embodiments of a polyester-based shrink film.

A first embodiment is a polyester-based shrink film derived from a polyester resin, the polyester-based shrink film satisfying the following configurations (a) to (c):
(a) the impact resistance strength before shrinking as measured by means of a pendulum-type film impact tester is designated as A1, and this is set to a value within the range of 20 to 60 J/mm;
(b) when the impact resistance strength measured by means of a pendulum-type film impact tester after having been shrunk by 10% in hot water at 80° C. is designated as A2, the numerical value represented by A2/A1×100 in the relationship with A1 is set to a value within the range of 60% to 110%; and
(c) when the shrinkage ratio in the case of having been shrunk under the conditions of hot water at 80° C. and 10 seconds is designated as B1, and the shrinkage ratio in the case of having been shrunk under the conditions of hot water at 90° C. and 10 seconds is designated as B2, the numerical value represented by B1/B2×100 is set to a value within the range of 70% to 90%.

Hereinafter, the configurations of the polyester-based shrink film of the first embodiment will be divided to specifically described various parameters and the like.

1. Polyester Resin

Basically, the type of the polyester resin does not matter; however, usually, it is preferable that the polyester resin is a polyester resin formed from a diol and a dicarboxylic acid, a polyester resin formed from a diol and a hydroxycarboxylic acid, a polyester resin formed from a diol, a dicarboxylic acid, and a hydroxycarboxylic acid, or a mixture of these polyester resins.

Here, the diol as a compound component of the polyester resin may be at least one of aliphatic diols such as ethylene glycol, diethylene glycol, propanediol, butanediol, neopentyl glycol, and hexanediol; alicyclic diols such as 1,4-cyclohexanedimethanol; aromatic diols; and the like.

Furthermore, the dicarboxylic acid as a compound component of the same polyester resin may be at least one of fatty acid dicarboxylic acids such as adipic acid, sebacic acid, and azelaic acid; aromatic dicarboxylic acids such as terephthalic acid, naphthalenedicarboxylic acid, and isophthalic acid; alicyclic dicarboxylic acids such as 1,4-cyclohexanedicarboxylic acid; ester-forming derivatives of these; and the like.

Furthermore, the hydroxycarboxylic acid as a compound component of the same polyester resin may be at least one of lactic acid, hydroxybutyric acid, polycaprolactone, and the like.

Furthermore, as the non-crystalline polyester resin, for example, a non-crystalline polyester resin formed from dicarboxylic acids composed of at least 80 mol % of terephthalic acid; and diols composed of 50 mol % to 80 mol % of ethylene glycol and 20 mol % to 50 mol % of one or more diols selected from 1,4-cyclohexanedimethanol, neopentyl glycol, and diethylene glycol, can be suitably used. In order to change the properties of the film as necessary, other dicarboxylic acids and diols or hydroxycarboxylic acids may also be used. Furthermore, these compound components may be used singly or as mixtures.

On the other hand, examples of the crystalline polyester resin include polyethylene terephthalate, polyethylene naphthalate, polybutylene terephthalate, polybutylene naphthalate, and polypropylene terephthalate, and these may be used singly or as mixtures.

Furthermore, when the polyester resin is a mixture of a non-crystalline polyester resin and a crystalline polyester resin, in order to obtain satisfactory heat resistance, shrinkage ratio, and the like, it is preferable to set the blending amount of the non-crystalline polyester resin to a value within the range of 90% to 100% by weight, and more preferably to a value within the range of 91% to 100% by weight, with respect to the total amount of the resins constituting the polyester-based shrink film.

2. Configuration (a)

Configuration (a) is an essential configurational requirement to the effect that the impact resistance strength before shrinking (may be referred to as A1) of the polyester-based shrink film of the first embodiment as measured by means of a pendulum-type film impact tester is set to a value within the range of 20 to 60 J/mm.

The reason for this is that when the impact resistance strength before shrinking is set to a value within a predetermined range as such, satisfactory impact resistance strength can be obtained for the polyester-based shrink film.

More specifically, it is because when the impact resistance strength (A1) before shrinking has a value of below 20 J/mm, the mechanical strength is decreased, and the high-speed automatic packaging suitability, printing suitability, and the like of the polyester-based shrink film may be inferior, or ripping may be likely to occur from an air vent pinhole provided by an automatic packaging machine.

On the other hand, it is because when the impact resistance strength (A1) before shrinking has a value of above 60 J/mm, it may be difficult to obtain a satisfactory and uniform shrinkage ratio near the shrinking temperature.

Therefore, regarding the configuration (a), it is more preferable to set the impact resistance strength before shrinking to a value within the range of 23 to 50 J/mm, and even more preferably to a value within the range of 25 to 40 J/mm.

Figure 2:
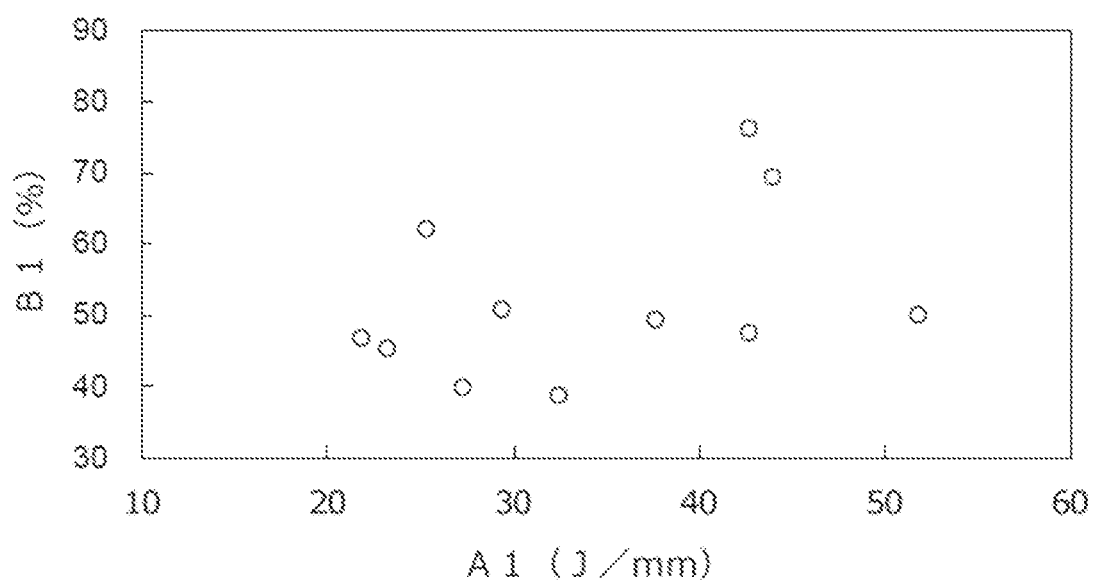
FIG. 2 is a diagram for describing the relationship for the polyester-based shrink film between the impact resistance strength (A1) before shrinking and the shrinkage ratio (B1) in the case of having been shrunk under predetermined heating conditions (hot water at 80° C., 10 seconds).
Figure 3:
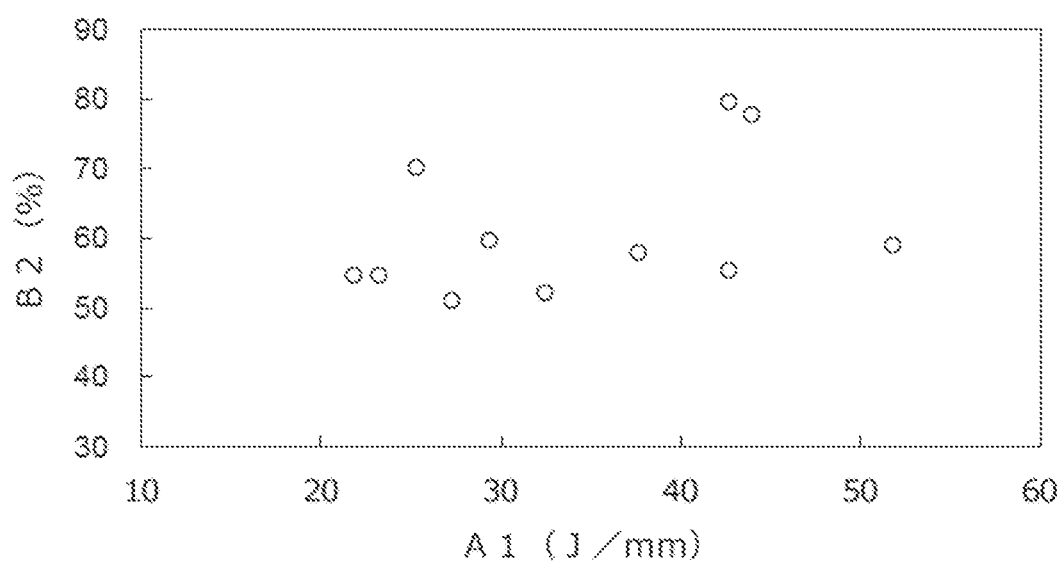
FIG. 3 is a diagram for describing the relationship for the polyester-based shrink film between the impact resistance strength (A1) before shrinking and the shrinkage ratio (B2) in the case of having been shrunk under predetermined heating conditions (hot water at 90° C., 10 seconds).

Here, FIG. 2 and FIG. 3 show the relationship between the impact resistance strength (A1) of a polyester-based shrink film before shrinking and the shrinkage ratios (B1, B2) of the polyester-based shrink film that has been heat-treated under predetermined conditions, respectively.

The measurement data shown in these FIG. 2 and FIG. 3 all vary considerably, and it is understood that the correlation between the impact resistance strength (A1) of the polyester-based shrink film before shrinking and the shrinkage ratio (B1, B2) of the polyester-based shrink film that has been heat-treated under predetermined conditions is poor.

Figure 4:
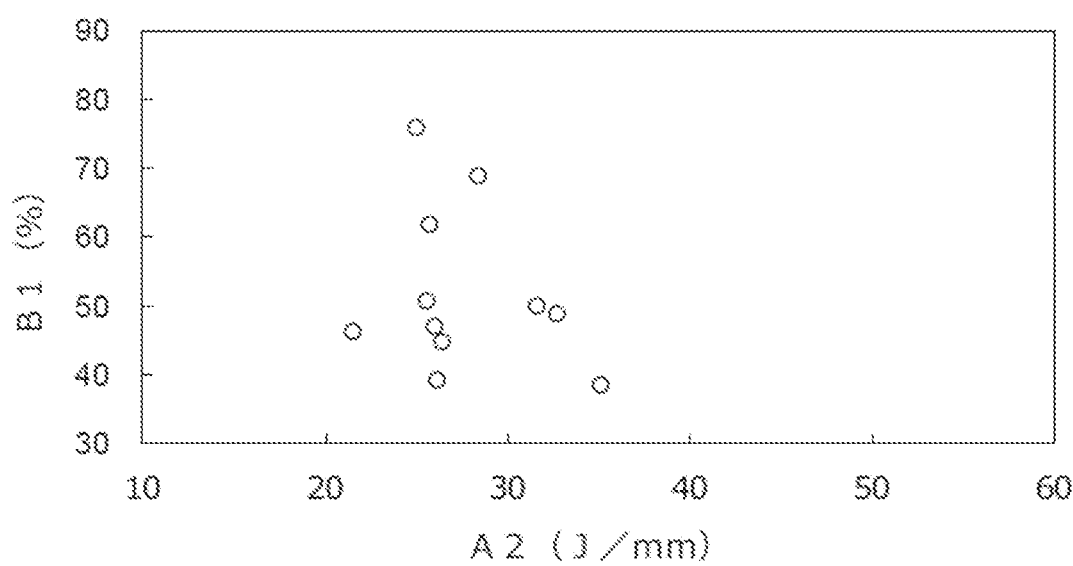
FIG. 4 is a diagram for describing the relationship for the polyester-based shrink film between the impact resistance strength (A2) after shrinking (hot water at 80° C., 10%) and the shrinkage ratio (B1) under predetermined heating conditions (hot water at 80° C., 10 seconds).
Figure 5:
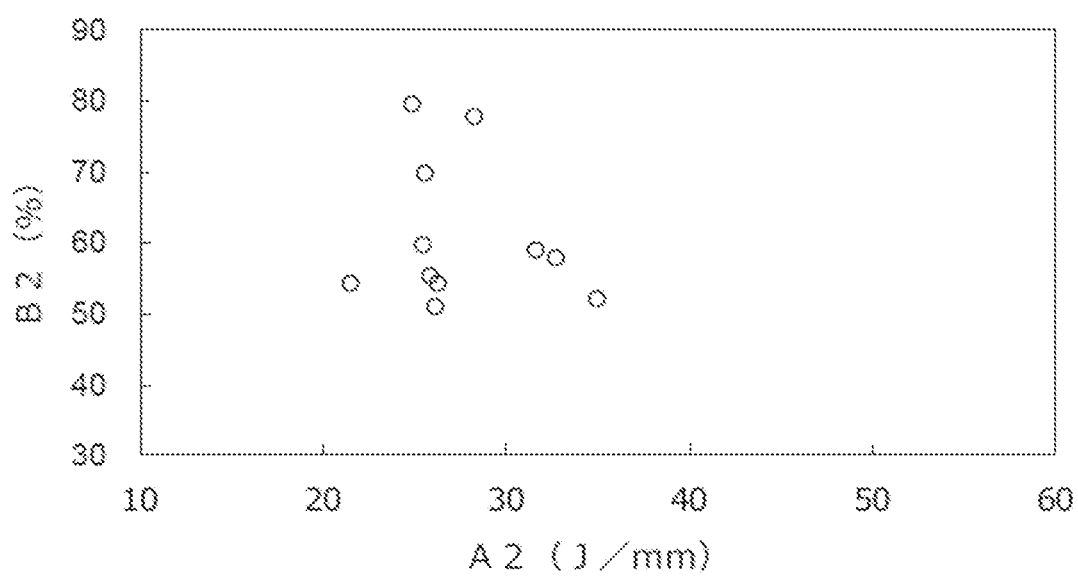
FIG. 5 is a diagram for describing the relationship for the polyester-based shrink film between the impact resistance strength (A2) after shrinking (hot water at 80° C., 10%) and the shrinkage ratio (B2) under predetermined heating conditions (hot water at 90° C., 10 seconds).

Furthermore, FIG. 4 and FIG. 5 show the relationship between the impact resistance strength (A2) of the polyester-based shrink film after having been shrunk under predetermined conditions and the shrinkage ratios (B1, B2) of the polyester-based shrink film that has been heat-treated under predetermined conditions, respectively.

The data shown in these FIG. 4 and FIG. 5 all vary considerably, and it is understood that the correlation between the impact resistance strength (A2) of the polyester-based shrink film after shrinking and the shrinkage ratios (B1, B2) of the polyester-based shrink film that has been heat-treated under predetermined conditions is poor.

Incidentally, the shrinkage ratio for the polyester-based shrink film of the first embodiment is defined by the following formula.

$$\text{Shrinkage ratio (\%)} = (L_0 - L_1)/L_0 \times 100$$

$L_0$: Dimension (longitudinal direction or width direction) of sample before heat treatment $L_1$: Dimension (same direction as $L_0$) of sample after heat treatment 3. Configuration (b)

Configuration (b) is an essential configurational requirement to the effect that when the impact resistance strength of the polyester-based shrink film of the first embodiment is designated as A1, and the impact resistance strength measured by a pendulum-type film impact tester after having been shrunk by 10% in hot water at 80° C. is designated as A2, the numerical value represented by A2/A1×100 is set to a value within the range of 60% to 110%.

The reason for this is that when the numerical value represented by A2/A1×100 is set to a value within a predetermined range as such, even in a case where the value of the impact resistance strength of the configuration (a) or the like slightly varies, predetermined influencing factors are decreased, and satisfactory impact resistance strength and predetermined ratios can be obtained for the polyester-based shrink film.

More specifically, it is because when the numerical value represented by A2/A1×100 has a value of below 60% or a value of above 110%, each of the shrinkage ratios (B1, B2) of the polyester-based shrink film has a large variation, and it may be difficult to obtain stable and uniform shrinkage ratios near the shrinking temperature such as 80° C. to 90° C.

Therefore, regarding the configuration (b), it is more preferable to set the numerical value represented by A2/A1×100 to a value within the range of 65% to 105%, and even more preferably to a value within the range of 68% to 100%.

In order to reliably control the numerical value represented by A2/A1×100 to be in a predetermined range, it is preferable to set the impact resistance strength A2 measured by means of a pendulum-type film impact tester after having been shrunk by 10% in hot water at 80° C. to a value within the range of 20 to 45 J/mm, more preferably to a value within the range of 23 to 40 J/mm, and even more preferably to a value within the range of 25 to 38 J/mm.

Figure 6:
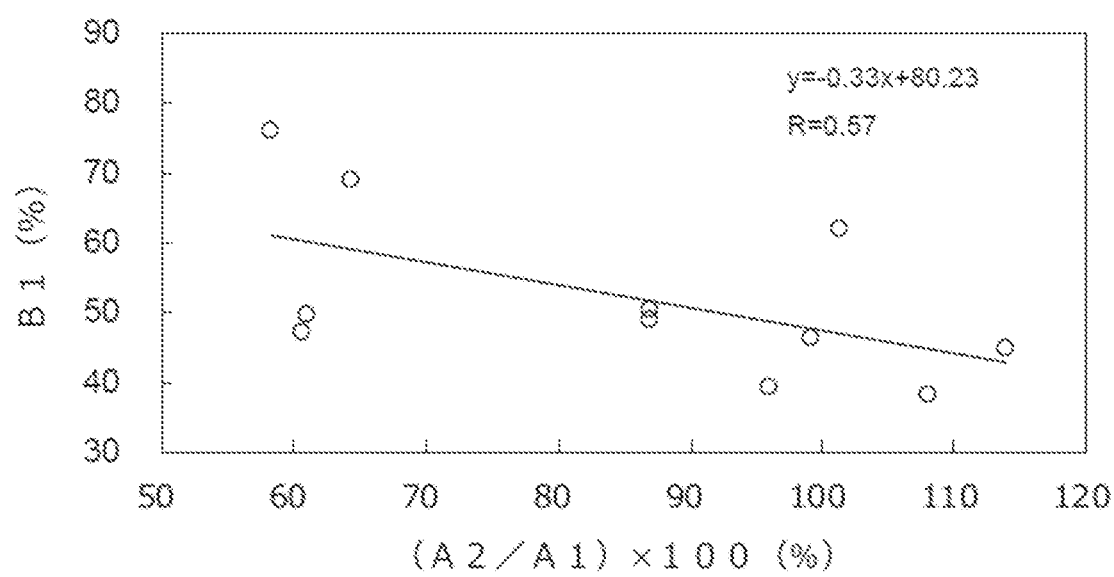
FIG. 6 is a diagram for describing the relationship for the polyester-based shrink film between the ratio of impact resistance strength (A2) after shrinking (hot water at 80° C., 10%)/impact resistance strength (A1) before shrinking and the shrinkage ratio (B1) under predetermined heating conditions (hot water at 80° C., 10 seconds).
Figure 7:
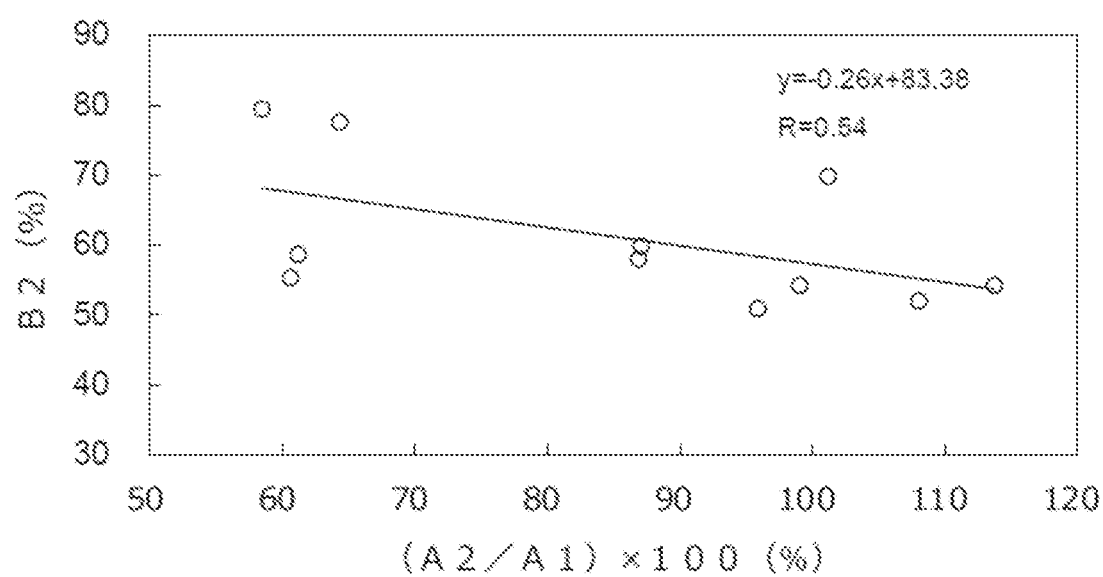
FIG. 7 is a diagram for describing the relationship for the polyester-based shrink film between the ratio of impact resistance strength (A2) after shrinking (hot water at 80° C., 10%)/impact resistance strength (A1) before shrinking and the shrinkage ratio (B2) under predetermined heating conditions (hot water at 90° C., 10 seconds).

Here, FIG. 6 and FIG. 7 show the relationship between the numerical value of A2/A1×100 and the shrinkage ratio (B1, B2) of the polyester-based shrink film that has been heat-treated under predetermined conditions, respectively.

Furthermore, in relation to the variation of the measurement data shown in FIG. 6, with regard to the relationship between the numerical value of A2/A1×100 and the shrinkage ratio (B1) of the polyester-based shrink film that has been heat-treated at 80° C. for 10 seconds, it is understood that there is a certain level of correlation (the correlation coefficient (R) obtained by approximation by a linear equation is 0.57).

Similarly, in relation to the variation of the measurement data shown in FIG. 7, with regard to the relationship between the numerical value of A2/A1×100 and the shrinkage ratio (B2) of the polyester-based shrink film that has been heat-treated at 90° C. for 10 seconds, it is understood that there is a correlation at a certain level (the coefficient of correlation (R) obtained by approximation by a linear equation is 0.54).

4. Configuration (c)

Configuration (c) is an essential configurational requirement to the effect that when the shrinkage ratio in the case of causing the polyester-based shrink film of the first embodiment to shrink under the conditions of 80° C. and 10 seconds is designated as B1, and the shrinkage ratio in the case of causing the film to shrink under the conditions of 90° C. and 10 seconds is designated as B2, the numerical value represented by B1/B2×100 is set to a value within the range of 70% to 90%.

The reason for this is that when the numerical value represented by B1/B2×100 is set to a value within a predetermined range as such, even in a case where the value of impact resistance strength of the configuration (a) or the configuration (b) slightly varies, stable and uniform shrinkage ratios can be obtained near the shrinking temperature of the polyester-based shrink film by reducing predetermined influencing factors.

More specifically, it is because when the numerical value represented by B1/B2×100 is below 70% or above 90%, each of the shrinkage ratios film has a large variation, and it may be difficult to obtain a stable and uniform shrinkage ratio near the shrinking temperature.

Therefore, regarding the configuration (c), it is more preferable to set the numerical value represented by B1/B2×100 to a value within the range of 72% to 88%, and even more preferably to a value within the range of 75% to 86%.

Figure 8A:
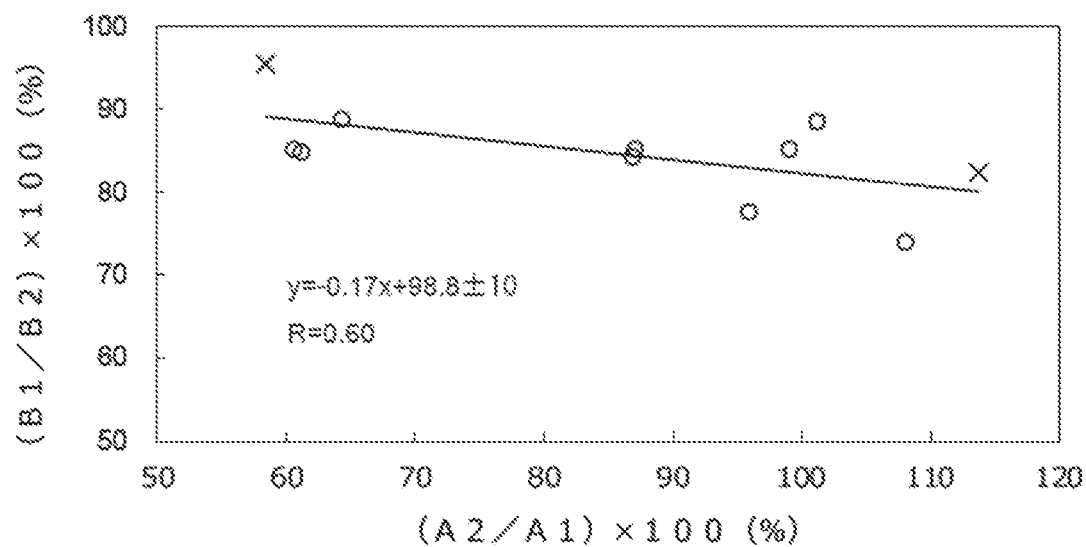
FIGS. 8A and 8B are diagrams for describing the relationship for the polyester-based shrink film between the ratio of impact resistance strength (A2) after shrinking (hot water at 80° C., 10%)/impact resistance strength (A1) before shrinking and the ratio of shrinkage ratio (B1) under predetermined heating conditions (hot water at 80° C., 10 seconds)/shrinkage ratio (B2) under predetermined conditions (hot water at 90° C., 10 seconds).
Figure 8B:
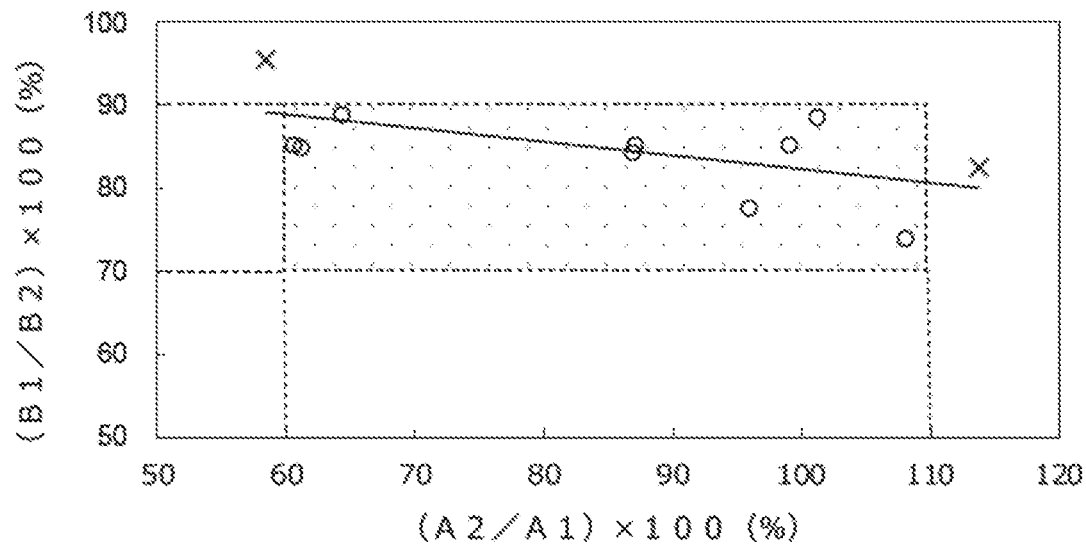

Here, FIG. 8A and FIG. 8B described the relationship between the numerical value represented by B1/B2×100 and the numerical value of A2/A1×100.

Then, when the numerical value of A2/A1×100 is below 60%, the numerical value represented by B1/B2×100 may have a large variation.

Furthermore, when the numerical value of A2/A1×100 is above 110%, a tendency that the variation of the numerical value represented by B1/B2×100 is slightly large.

Therefore, it is considered that it is effective to set the numerical value of A2/A1×100 to a value within the range of 60% to 110%, for the purpose of making the numerical value represented by B1/B2×100 uniform and stabilized.

Therefore, in order to make the numerical value represented by B1/B2×100 more uniform and more stable, it can be said that it is preferable to set the numerical value of A2/A1×100 to a value within the range of 62% to 108%, and more preferably to a value within the range of 65% to 105%.

5. Optional Configurational Requirement (1) Configuration (d)

Furthermore, configuration (d) is an optional configurational requirement to the effect that with regard to a polyester-based shrink film at the time of having been shrunk by 10% in hot water at 80° C., the impact resistance strength (A2) measured by means of a pendulum-type film impact tester is set to a value within the range of 20 to 45 J/mm.

The reason for this is that by specifically limiting such A2 in this way, the numerical value represented by A2/A1×100 is likely to be controlled to a value within a predetermined range.

More specifically, it is because when A2 of the impact resistance strength has a value of below 20 J/mm, the high-speed automatic packaging suitability and printing suitability may be inferior, and that due to a decrease in the tear strength, ripping may be likely to occur from an air vent pinhole provided by an automatic packaging machine.

On the other hand, it is because when A2 of the impact resistance strength has a value of above 45 J/mm, it may be difficult to obtain a stable and uniform shrinkage ratio near the shrinking temperature.

Therefore, regarding the configuration (d), it is more preferable to set A2 of the impact resistance to a value within the range of 23 to 43 J/mm, and even more preferably to a value within the range of 25 to 40 J/mm.

(2) Configuration (e)

Furthermore, configuration (e) is an optional configurational requirement to the effect that with regard to the polyester-based shrink film of the first embodiment, B1, which is the shrinkage ratio in the case of having been shrunk under the conditions of 80° C. and 10 seconds, is set to a value within the range of 35% to 80%, and B2, which is the shrinkage ratio in the case of having been shrunk under the conditions of 90° C. and 10 seconds, is set to a value within the range of 40% to 85%.

The reason for this is that by specifically limiting each of such B1 and B2, consequently the numerical value represented by B1/B2×100 is easily controlled to a value within a predetermined range.

In other words, it is because when B1 of the shrinkage ratio has a value of below 35% or has a value of above 80%, it may be difficult to control the numerical value represented by B1/B2×100 to a value within a predetermined range in each case.

On the other hand, it is because in a case where B2 of the shrinkage ratio has a value of below 40% or a value of above 85%, when the shrink film is applied to a PET bottle as a decorative label, the label may not firmly adhere to the bottle, and a gap may be generated.

Furthermore, it is because it may be difficult to control the numerical value represented by B1/B2×100 to a value within a predetermined range in each case.

Therefore, regarding the configuration (e), it is more preferable to set B1 of the shrinkage ratio to a value within the range of 40% to 75%, and to set B2 of the shrinkage ratio to a value within the range of 45% to 80%.

Furthermore, regarding the configuration (e), it is even more preferable to set B1 of the shrinkage ratio to a value within the range of 45% to 70%, and to set B2 of the shrinkage ratio to a value within the range of 50% to 75%.

Incidentally, with regard to the polyester-based shrink film, it is preferable that B1, which is the shrinkage ratio in the case of being shrunk under the conditions of 80° C. and 10 seconds, and B2, which is the shrinkage ratio in the case of being shrunk under the conditions of 90° C. and 10 seconds, are each adjusted to a value within a predetermined range so as to limit the numerical value represented by B1/B2×100 to a value within a predetermined range.

More specifically, it is preferable to set the numerical value represented by B1/B2×100 to a value within the range of 70% to 90%, more preferably to a value within the range of 72% to 88%, and even more preferably to a value within the range of 75% to 86%.

The reason for this is that the value of the shrinkage ratio near the shrinking temperature of the polyester-based shrink film is limited to a narrower range, the temperature reactivity at the time of shrinking becomes favorable, and the product yield as a decorative label for PET bottles can be increased.

(3) Configuration (f)

Furthermore, configuration (f) is an optional configurational requirement to the effect that with regard to the polyester-based shrink film of the first embodiment, the film thickness before shrinking is set to a value within the range of 10 to 100 μm.

The reason for this is that by specifically limiting the film thickness before shrinking to a value within a predetermined range as such, each of the numerical value represented by A2/A1×100, the numerical value represented by B1/B2×100, and the like may be more easily controlled to a value within a predetermined range.

More specifically, it is because when the film thickness before shrinking has a value of below 10 μm or a value of above 100 μm, it may be difficult to adjust the shrinkage ratio and the impact resistance strength in each case, and accurate adjustment of the numerical value represented by A2/A1×100, the numerical value represented by B1/B2×100, and the like may also become difficult.

Therefore, regarding the configuration (f), it is more preferable to set the film thickness before shrinking to a value within the range of 10 to 100 μm, and even more preferably to a value within the range of 25 to 40 μm.

(4) Configuration (g)

Furthermore, configuration (g) is an optional configurational requirement to the effect that with regard to the polyester-based shrink film of the first embodiment, the stretch ratio in the MD direction of the film before shrinking is set to a value within the range of 100% to 200%.

The reason for this is that by specifically limiting the stretch ratio in the MD direction of the film before shrinking to a value within a predetermined range as such, each of the numerical value represented by A2/A1×100, the numerical value represented by B1/B2×100, and the like is likely to be controlled more easily and quantitatively to a value within a predetermined range.

More specifically, it is because when the stretch ratio in the MD direction of the film before shrinking has a value of below 100%, the product yield in the manufacture may be markedly decreased.

On the other hand, it is because when the stretch ratio in the MD direction is above 200%, the stretch ratio may affect the shrinkage ratio in the TD direction, and adjustment of the shrinkage ratio itself may be difficult.

Therefore, regarding the configuration (g), it is more preferable to set the stretch ratio in the MD direction of the film before shrinking to a value within the range of 110% to 180%, and even more preferably to a value within the range of 120% to 170%.

(5) Configuration (h)

Furthermore, configuration (h) is an optional configurational requirement to the effect that with regard to the polyester-based shrink film of the first embodiment, the stretch ratio in the TD direction of the film before shrinking is set to a value within the range of 300% to 600%.

The reason for this is that by specifically limiting the stretch ratio in the MD direction as well as the stretch ratio in the TD direction of the film before shrinking to values in the predetermined ranges as such, each of the numerical value represented by A2/A1×100, the numerical value represented by B1/B2×100, and the like are likely to be controlled more easily and quantitatively to a value within a predetermined range.

More specifically, it is because when the stretch ratio in the TD direction of the film before shrinking has a value of below 300%, the shrinkage ratio in the TD direction may be markedly decreased, and the use applications of the polyester-based shrink film that can be used may be excessively limited.

On the other hand, it is because when the stretch ratio in the TD direction of the film before shrinking has a value of above 600%, the shrinkage ratio may become remarkably large, and the use applications of the polyester-based shrink film that can be used may be excessively limited, or it may be difficult to constantly control the stretch ratio itself.

Therefore, regarding the configuration (h), it is more preferable that the stretch ratio in the TD direction of the film before shrinking is set to a value within the range of 350% to 550%, and even more preferably to a value within the range of 400% to 500%.

(6) Configuration (i)

Furthermore, configuration (I) is an optional configurational requirement to the effect that with regard to the polyester-based shrink film of the first embodiment, the haze value of the film before shrinking as measured according to JIS K 7105 is set to a value of 5% or less.

The reason for this is that by specifically limiting the haze value to a value within a predetermined range as such, transparency of the polyester-based shrink film is also likely to be controlled quantitatively.

More specifically, it is because when the haze value of the film before shrinking has a value of above 5%, transparency may be decreased, and it may be difficult to apply the film to decorative use applications for PET bottles and the like.

On the other hand, when the haze value of the film before shrinking becomes excessively small, it may be difficult to stably control the haze value, and the product yield in the production may be markedly decreased.

Therefore, regarding the configuration (I), it is more preferable that the haze value of the film before shrinking is set to a value within the range of 0.1% to 3%, and even more preferably to a value within the range of 0.5% to 1%.

(7) Configuration (j)

Furthermore, configuration (j) is an optional configurational requirement to the effect that the polyester-based shrink film of the first embodiment includes a non-crystalline polyester resin at a proportion of 90% to 100% by weight of the total amount.

The reason for this is that by specifically limiting the content of the non-crystalline polyester resin to a value within a predetermined range as such, even when the values of the impact resistance strength of the configuration (a) and the configuration (b) slightly vary, the blending amount and the like can be appropriately adjusted, and predetermined influencing factors can be reduced.

Therefore, as a result, the impact resistance strength and the shrinkage ratio near the shrinking temperature of the polyester-based shrink film can be adjusted to desired ranges, and at the same time, the haze value and the like are also likely to be controlled quantitatively.

More specifically, it is because when the content of the non-crystalline polyester resin has a value of below of 90%, it may be difficult to control the impact resistance strength and the shrinkage ratio near the shrinking temperature of the polyester-based shrink film.

However, when the content of the non-crystalline polyester resin becomes excessively large, there is a possibility that the scope of reducing predetermined influencing factors may notably narrowed.

Therefore, regarding the configuration (j), it is more preferable that the content of the non-crystalline polyester resin is set to a value within the range of 90% to 100% by weight, and even more preferably to a value within the range of 91% to 100% by weight, of the total amount.

(8) Others

It is preferable that various additives are blended into or caused to adhere to the polyester-based shrink film of the first embodiment or on one surface or both surfaces of the polyester-based shrink film.

More specifically, usually, it is preferable that at least one of a hydrolysis inhibitor, an antistatic agent, an ultraviolet absorber, an infrared absorber, a colorant, an organic filler, an inorganic filler, an organic fiber, an inorganic fiber, and the like is blended at a proportion in the range of 0.01% to 10% by weight, and more preferably blended at a proportion in the range of 0.1% to 1% by weight, with respect to the total amount of the polyester-based shrink film.

Figure 1B:
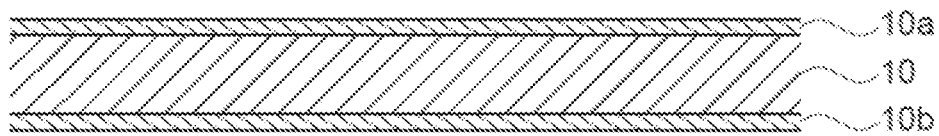

Furthermore, as shown in FIG. 1B, it is also preferable that other resins layers 10a and 10b including at least one of these various additives are laminated on one surface or both surfaces of the polyester-based shrink film 10.

In that case, when the thickness of the polyester-based shrink film is taken as 100%, it is preferable that usually, the single layer thickness or the total thickness of the other resin layers to be additionally laminated is usually set to a value within the range of 0.1% to 10%.

Then, the resin as a main component that constitutes the other resin layers may be a polyester resin similar to that of the polyester-based shrink film, or it is preferable that the resin is at least one of an acrylic resin different from the polyester resin, an olefin-based resin, a urethane-based resin, a rubber-based resin, and the like.

Figure 1C:
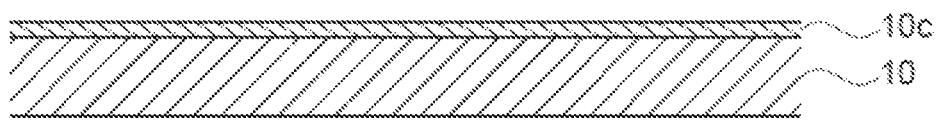

Furthermore, it is also preferable to provide a shrinkage ratio adjusting layer 10c on the surface of the polyester-based shrink film 10 so that the polyester-based shrink film is made to have a multilayer structure to further promote a hydrolysis inhibitory effect and mechanical protection, or the shrinkage ratio of the polyester-based shrink film is made uniform in-plane as shown in FIG. 1C.

Such a shrinkage ratio adjusting layer can be laminated by means of an adhesive, a coating method, a heat treatment, or the like according to the shrinkage characteristics of the polyester-based shrink film.

More specifically, the thickness of the shrinkage ratio adjusting layer is in the range of 0.1 to 3 μm, and when the shrinkage ratio of the polyester-based shrink film at a predetermined temperature is excessively large, it is preferable to laminate a shrinkage ratio adjusting layer of a type that suppresses the shrinkage ratio.

Furthermore, when the shrinkage ratio of the polyester-based shrink film at a predetermined temperature is excessively small, it is preferable to laminate a shrinkage ratio adjusting layer of a type that extends the shrinkage ratio.

Therefore, regarding the polyester-based shrink film, it is intended to obtain a desired shrinkage ratio by means of the shrinkage ratio adjusting layer, without producing various shrink films having different shrinkages.

Second Embodiment

A second embodiment is an embodiment related to a method for producing the polyester-based shrink film of the first embodiment.

1. Step of Preparing and Mixing Raw Materials

First, it is preferable to prepare main agents and additives, such as a non-crystalline polyester resin, a crystalline polyester resin, a rubber-based resin, an antistatic agent, and a hydrolysis inhibitor, as raw materials.

Next, it is preferable that the prepared crystalline polyester resin, non-crystalline polyester resin, and the like are introduced into a stirring vessel while being weighed, and the materials are mixed and stirred by using a stirring device until the mixture becomes uniform.

2. Step of Producing Raw Material Sheet

Next, it is preferable that the raw materials that have been uniformly mixed is dried into an absolute dry state.

Next, typically, it is preferable that extrusion molding is performed, and a raw material sheet having a predetermined thickness is produced.

More specifically, for example, extrusion molding is performed by means of an extruder (manufactured by TANABE PLASTICS MACHINERY CO., LTD.) having an L/D of 24 and an extruding screw diameter of 50 mm under the conditions of an extrusion temperature of 180° C., and a raw material sheet having a predetermined thickness (usually, 10 to 100 μm) can be obtained.

3. Production of Polyester-Based Shrink Film

Next, the obtained raw material sheet is heat-pressed while being moved on a roll or between rolls, and a polyester-based shrink film is produced.

That is, it is preferable to crystallize the polyester molecules that constitute the polyester-based shrink film into a predetermined shape by stretching the polyester-based shrink film in a predetermined direction while heat-pressing the film, while basically expanding the film width at a predetermined stretching temperature and a predetermined stretch ratio.

Then, by solidifying the polyester-based shrink film in that state, a heat-shrinkable polyester-based shrink film that is used for decoration, labeling, and the like can be produced.

4. Step of Inspecting Polyester-Based Shrink Film

It is preferable that the following characteristics and the like are measured continuously or intermittently for the produced polyester-based shrink film, and a predetermined inspection step is provided.

That is, a polyester-based shrink film having more uniform shrinkage characteristics and the like can be produced by measuring the following characteristics and the like by a predetermined inspection step and checking whether the characteristics have values within predetermined ranges.

1) Visual inspection of polyester-based shrink film
2) Measurement of thickness unevenness
3) Measurement of tensile modulus
4) Measurement of tear strength
5) Measurement of viscoelastic characteristics by means of SS curve Then, it can be said that it is preferable to consider measurement of the following (a) to (c) for the production of a polyester-based shrink film of the second embodiment:

(a) impact resistance strength A1 before shrinking as measured by means of a pendulum-type film impact tester;
(b) when the impact resistance strength measured by means of a pendulum-type film impact tester after having been shrunk by 10% in hot water at 80° C. is designated as A2, a numerical value represented by A2/A1×100; and
(c) when the shrinkage ratio in the case of having been shrunk under the conditions of 80° C. and 10 seconds is designated as B1, and the shrinkage ratio in the case of having been shrunk under the conditions of 90° C. and 10 seconds is designated as B2, a numerical value represented by B1/B2×100.

Third Embodiment

A third embodiment is an embodiment related to a method of using a polyester-based shrink film.

Therefore, known methods of using a shrink film can all be suitably applied.

For example, upon performing a method of using a polyester-based shrink film, first, a polyester-based shrink film is cut into an appropriate length or width, and at the same time, a long tubular-shaped object is formed.

Next, this long tubular-shaped object is supplied to an automatic label mounting apparatus (shrink labeler) and cut into a necessary length.

Next, the resultant is externally fitted onto a PET bottle filled with contents, or the like.

Next, as a heat treatment for the polyester-based shrink film externally fitted onto a PET bottle or the like, the polyester-based shrink film is passed through the interior of a hot air tunnel or a steam tunnel at a predetermined temperature.

Then, the polyester-based shrink film is uniformly heated to be thermally shrunk by emitting radiant heat such as infrared radiation or heating steam at about 90° C. provided in these tunnels from the surroundings.

Therefore, the polyester-based shrink film can be adhered to the external surface of the PET bottle or the like, and thus a labeled container can be quickly obtained.

Here, according to the polyester-based shrink film of the invention, by satisfying at least the configurations (a) and (b), even when the value of impact resistance strength of the configuration (a) slightly varies, suitable impact resistance strength can be obtained for the polyester-based shrink film by reducing predetermined influencing factors.

Therefore, as will be described below, satisfactory results can be obtained in a predetermined drop test.

Moreover, by satisfying the configuration (c), even when the values of impact resistance strength of the configuration (a) and the configuration (b) slightly vary, stable and highly uniform shrinkability can be obtained near the shrinking temperature of the polyester-based shrink film by reducing predetermined influencing factors.

Furthermore, since the polyester-based shrink film of the invention substantially does not include a lactic acid-derived structural unit, there is an advantage that strict humidity management and the like under the storage conditions are not required.

EXAMPLES

Hereinafter, the invention will be described in detail based on Examples. However, unless particularly stated otherwise, the scope of rights of the invention shall not be narrowed by the description of the Examples.

The resins used in the Examples are as follows.

(PETG1)

A non-crystalline polyester composed of dicarboxylic acid: 100 mol % of terephthalic acid; and diols: 70 mol % of ethylene glycol, 25 mol % of 1,4-cyclohexanedimethanol, and 5 mol % of diethylene glycol (PETG2)

A non-crystalline polyester composed of dicarboxylic acid: 100 mol % of terephthalic acid; and diols: 72 mol % of ethylene glycol, 25 mol % of neopentyl glycol, and 3 mol % of diethylene glycol (APET)

A crystalline polyester composed of dicarboxylic acid; 100 mol % of terephthalic acid; and diol: 100 mol % of ethylene glycol (PBT)

A crystalline polyester composed of dicarboxylic acid: 100 mol % terephthalic acid; and diol: 100 mol % of 1,4-butanediol

Example 1

1. Production of Polyester-Based Shrink Film

In a stirring vessel, 100 parts by weight of a non-crystalline polyester resin (PETG1) was used.

Next, this raw material was dried into an absolute dry state, subsequently extrusion molding was performed by means of an extruder (manufactured by Tanabe TANABE PLASTICS MACHINERY CO., LTD.) with an L/D of 24 and an extrusion screw diameter of 50 mm under the conditions of an extrusion temperature of 180° C., and a raw material sheet having a thickness of 100 μm was obtained.

Next, a polyester-based shrink film having a thickness of 30 μm was obtained from the raw material sheet by using a shrink film production apparatus at a stretching temperature of 83° C. and a stretch ratio of (MD direction: 105% and TD direction: 480%).

2. Evaluation of Polyester-Based Shrink Film (1) Thickness

The thickness (30 μm as a desired value was used as a reference value) of the obtained polyester-based shrink film was measured by using a micrometer, and the thickness was evaluated according to the following criteria.

Very Good (VG): The variation of the thickness has a value within the range of (reference value±0.1 μm).

Good (G): The variation of the thickness has a value within the range of (reference value±0.5 μm).

Fair (F): The variation of the thickness has a value within the range of (reference value±1.0 μm).

Bad (B): The variation of the thickness has a value within the range of (reference value±3.0 μm).

(2) Impact Resistance Strength 1

According to ASTM-D3420, the impact resistance strength (J/mm, A1) of the polyester-based shrink film before shrinking was measured by using a T.S.S. film impact tester (manufactured by Toyo Seiki Seisaku-sho, Ltd.) in which the tip of the pendulum is a hemisphere, and the impact resistance strength was evaluated according to the following criteria.

Very Good (VG): A value within the range of 25 to 40 J/mm is obtained.

Good (G): A value within the range of 23 to 50 J/mm, which is a value out of the range of 25 to 40 J/mm, is obtained.

Fair (F): A value within the range of 20 to 60 J/mm, which is a value out of the range of 23 to 50 J/mm, is obtained.

Bad (B): A value out of the range of 20 to 60 J/mm is obtained.

(3) Impact Resistance Strength 2

The impact resistance strength (J/mm, A2) of the polyester-based shrink film after having been shrunk by 10% in hot water at 80° C. was measured in the same manner as in the measurement of the impact resistance strength 1, and the impact resistance strength was evaluated according to the following criteria.

Very Good (VG): A value within the range of 25 to 38 J/mm is obtained.

Good (G): A value within the range of 23 to 40 J/mm, which is a value out of the range of 25 to 38 J/mm, is obtained.

Fair (F): A value within the range of 20 to 45 J/mm, which is a value out of the range of 23 to 40 J/mm, is obtained.

Bad (B): A value out of the range of 20 to 45 J/mm is obtained.

(4) Impact Resistance Strength 3

From the impact resistance strength (A2/A1) of the polyester-based shrink film before and after shrinking, A2/A1× 100 was calculated and evaluated according to the following criteria.

Very Good (VG): A value within the range of 65% to 105% is obtained.

Good (G): A value within the range of 60% to 110%, which is a value out of the range of 65% to 105%, is obtained.

Fair (F): A value within the range of 50% to 120%, which is a value out of the range of 60% to 110%, is obtained.

Bad (B): A value out of the range of 50% to 120% is obtained.

(5) Shrinkage Ratio 1

The obtained polyester-based shrink film (TD direction) was immersed in hot water at 80° C. for 10 seconds (condition B1) by using a constant temperature tank to cause thermal shrinkage.

Next, the shrinkage ratio (B1) was calculated according to the following formula from the dimensional change before and after each heat treatment, and the shrinkage ratio was evaluated according to the following criteria.

Shrinkage ratio=(Length of film before thermal shrinkage−length of film after thermal shrinkage)/length of film before thermal shrinkage× 100

Very Good (VG): The shrinkage ratio (B1) has a value within the range of 35% to 80%.

Good (G): The shrinkage ratio (B1) has a value within the range of 30% to 85%, which is a value out of the range of 35% to 80%.

Fair (F): The shrinkage ratio (B1) has a value within the range of 25% to 90%, which is a value out of the range of 30% to 85%.

Bad (B): The shrinkage ratio (B1) has a value out of the range of 25% to 90%.

(6) Shrinkage Ratio 2

The obtained polyester-based shrink film (TD direction) was immersed in hot water at 90° C. for 10 seconds (condition B2) by using a constant temperature tank to cause thermal shrinkage.

Next, the shrinkage ratio (B2) was calculated according to the following formula from the dimensional change before and after each heat treatment, and the shrinkage ratio was evaluated according to the following criteria.

Shrinkage ratio=(Length of film before thermal shrinkage−length of film after thermal shrinkage)/length of film before thermal shrinkage× 100

Very Good (VG): The shrinkage ratio (B2) has a value within the range of 50% to 75%.

Good (G): The shrinkage ratio (B2) has a value within the range of 45% to 80%, which is a value out of the range of 50% to 75%.

Fair (F): The shrinkage ratio (B2) has a value within the range of 40% to 85%, which is a value out of the range of 45% to 80%.

Bad (B): The shrinkage ratio (B2) has a value out of the range of 40% to 85%.

(7) Shrinkage Ratio 3

From the shrinkage ratios (B1, B2 in the TD direction) of the obtained polyester-based shrink film, B1/B2×100 was calculated and evaluated according to the following criteria.

Very Good (VG): The shrinkage ratio 3 has a value within the range of 75% to 85%.

Good (G): The shrinkage ratio 3 has a value within the range of 70% to 90%, which is a value out of the range of 75% to 85%.

Fair (F): The shrinkage ratio 3 has a value within the range of 65% to 98%, which is a value out of the range of 70% to 90%.

Bad (B): The shrinkage ratio 3 has a value out of the range of 65% to 98%.

(8) Haze

The haze value of the obtained polyester-based shrink film was measured according to JIS K 7105, and the haze value was evaluated according to the following criteria.

Very Good (VG): A value of 1% or less is obtained.

Good (G): A value of 3% or less is obtained.

Fair (F): A value of 5% or less is obtained.

Bad (B): A value of above 5% is obtained.

(9) Drop test

A cylindrical-shaped PET bottle in a state of being filled with a commercially available beverage was prepared (trade name: Evian, volume: 500 ml).

Next, a long shrink film obtained by slitting the polyester-based shrink film into a width of 26 cm was provided with perforations having a width of 1 mm along the longitudinal direction, 1,3-dioxolane was applied on the ends in the width direction, the ends in the width direction were superposed and adhered to each other such that the overlap space was about 1 cm, and a tubular-shaped film having a diameter of about 8 cm was obtained. Furthermore, this tubular-shaped film was cut out every 5 cm in the longitudinal direction to obtain a plurality of tubular-shaped labels.

Next, the cylindrical-shaped PET bottle was covered with the tubular-shaped label, placed on a belt conveyor, and moved through a steam tunnel maintained at 85° C. at a passing speed of 6 m/min, and thus the tubular-shaped label was thermally shrunk so as to adhere to the cylindrical-shaped PET bottle.

Next, the label-shaped polyester-based shrink film was used as a sample for drop test, after the perforations were torn off such that the remaining width of the label was one remaining perforation.

Next, the sample for drop test was naturally dropped from a height of 1.5 m onto the surface of a floor made of concrete, the number of times taken until the label-shaped polyester-shrink film was visually cut, damaged, or the like was measured, and the drop test properties were evaluated according to the following criteria.

Very Good (VG): The sample withstands three or more times of the drop test.

Good (G): The sample withstands two or more times of the drop test.

Fair (F): The sample withstands one time of the drop test.

Bad (B): The sample may not withstand one time of the drop test.

Examples 2 to 9

In Examples 2 to 9, polyester-based shrink films were produced in the same manner as in Example 1, except that the values of the configurations (a) to (c) and the like were changed in each case as shown in Table 1 and Table 2, and the polyester-based shrink films were evaluated.

That is, in Example 2, evaluation was performed in the same manner as in Example 1, except that a polyester-based shrink film having a thickness of 25 μm was produced by using the non-crystalline polyester resin (PETG1) as a raw material and changing the extrusion conditions.

Furthermore, in Example 3, evaluation was performed in the same manner as in Example 1, except that a polyester-based shrink film having a thickness of 30 μm was produced by using the non-crystalline polyester resin (PETG1) as a raw material and changing the extrusion conditions.

Furthermore, in Example 4, evaluation was performed in the same manner as in Example 1, except that a polyester-based shrink film having a thickness of 30 μm was produced by mixing 90 parts by weight of the non-crystalline polyester resin (PETG1) and 10 parts by weight of the crystalline polyester resin (APET) in the above-described proportions, using this mixture as a raw material, and changing the extrusion conditions.

Furthermore, in Example 5, evaluation was performed in the same manner as in Example 1, except that a polyester-based shrink film having a thickness of 25 μm was produced by mixing 90 parts by weight of the non-crystalline polyester resin (PETG1) and 10 parts by weight of the crystalline polyester resin (PBT) in the above-described proportions, using this mixture as a raw material, and changing the extrusion conditions.

Furthermore, in Example 6, evaluation was performed in the same manner as in Example 1, except that a polyester-based shrink film having a thickness of 40 μm was produced by using the non-crystalline polyester resin (PETG2) only as a raw material and changing the extrusion conditions.

Furthermore, in Example 7, evaluation was performed in the same manner as in Example 1, except that a polyester-based shrink film having a thickness of 39 μm was produced by using only the non-crystalline polyester resin (PETG2) as a raw material and changing the extrusion conditions.

Furthermore, in Example 8, evaluation was performed in the same manner as in Example 1, except that a polyester-based shrink film having a thickness of 21 μm was produced by using only the non-crystalline polyester resin (PETG2) as a raw material and changing the extrusion conditions.

Furthermore, in Example 9, evaluation was performed in the same manner as in Example 1, except that a polyester-based shrink film having a thickness of 22 μm was produced by using only the non-crystalline polyester resin (PETG2) as a raw material and changing the extrusion conditions.

Comparative Example 1

In Comparative Example 1, a polyester-based shrink film that did not satisfy the configurational requirement (b) was produced as shown in Table 1 and Table 2 and was evaluated in the same manner as in Example 1.

That is, a polyester-based shrink film having a thickness of 25 μm, which did not satisfy the configurational requirement (b), was produced by using only the same non-crystalline polyester resin (PETG1) as that used in Example 1 as a raw material.

Comparative Example 2

In Comparative Example 2, a polyester-based shrink film that did not satisfy the configurational requirement (b) and the configurational requirement (c) was produced as shown in Table 1 and Table 2 and was evaluated in the same manner as in Example 1.

That is, a polyester-based shrink film having a thickness of 29 μm, which did not satisfy the configurational requirement (b) and the configurational requirement (c), was produced by using only the non-crystalline polyester resin (PETG2) as a raw material.

TABLE 1

|  | PETG1 (parts by weight) | PETG2 (parts by weight) | APET (parts by weight) | PBT (parts by weight) | Thickness (μm) |
|---|---|---|---|---|---|
| Example 1 | 100 | | | | 30 |
| Example 2 | 100 | | | | 25 |
| Example 3 | 100 | | | | 30 |
| Example 4 | 90 | | 10 | | 30 |
| Example 5 | 90 | | | 10 | 25 |
| Example 6 | | 100 | | | 40 |
| Example 7 | | 100 | | | 39 |
| Example 8 | | 100 | | | 21 |
| Example 9 | | 100 | | | 22 |
| Comparative Example 1 | 100 | | | | 25 |
| Comparative Example 2 | | 100 | | | 29 |

TABLE 2

|  | Stretching temperature (° C.) | Thermal fixation temperature (° C.) | MD stretch ratio (%) | TD stretch ratio (%) |
|---|---|---|---|---|
| Example 1 | 83 | 81 | 105 | 480 |
| Example 2 | 84 | 82 | 125 | 480 |
| Example 3 | 76 | 73 | 105 | 460 |
| Example 4 | 83 | 82 | 100 | 500 |
| Example 5 | 81 | 80 | 125 | 480 |
| Example 6 | 88 | 85 | 120 | 450 |
| Example 7 | 80 | 75 | 105 | 480 |
| Example 8 | 90 | 85 | 200 | 350 |
| Example 9 | 90 | 85 | 180 | 350 |
| Comparative Example 1 | 86 | 85 | 111 | 500 |
| Comparative Example 2 | 75 | 73 | 105 | 480 |

INDUSTRIAL APPLICABILITY

According to the invention, a polyester-based shrink film having excellent impact resistance and having a uniform shrinkage ratio near the shrinking temperature, and the like can be provided by solving the drawbacks of conventional polyolefin-based shrink films and a polyester-based shrink film including a structural unit obtained by dehydration and condensation of lactic acid.

The invention claimed is:

1. A polyester-based shrink film comprising at least 90 weight % of a non-crystalline polyester resin being a mixture of a non-crystalline polyester resin and a crystalline polyester resin, the film including at least 90 weight % of the non-crystalline polyester resin based on the total amount of resins,
where the crystalline polyester resin being one or more selected from polyethylene terephthalate, polyethylene naphthalate, polybutylene terephthalate, polybutylene naphthalate, and polypropylene terephthalate,
where the non-crystalline resin being one or more of:
non-crystalline polyester resins formed from a dicarboxylic acid comprising at least 80 mol % of terephthalic acid; and diols comprising 50 mol % to 80 mol % of ethylene glycol and 20 mol % to 50 mol % of one or more diols selected from 1,4-cyclohexanedimethanol, neopentyl glycol, and diethylene glycol,
where the film satisfying the following configurations (a) to (c):
(a) an impact resistance strength before shrinking as measured by means of a pendulum-type film impact tester is designated as A1, and A1 is set to a value within a range of 20 to 60 J/mm;
(b) an impact resistance strength measured by means of a pendulum-type film impact tester after having been shrunk by 10% in hot water at 80° C. is designated as A2, a numerical value represented by A2/A1×100 is set to a value within a range of 60% to 110%; and
(c) a shrinkage ratio in a case of having been shrunk in hot water at 80° C. under the conditions of 10 seconds is designated as B1, and a shrinkage ratio in a case of

TABLE 3

|  | (a) A1 | (b) (A2/A1) × 100 | (c) (B1/B2) × 100 | A2 | B1 | B2 | Evaluation 1 | Evaluation 2 | Evaluation 3 | Evaluation 4 | Evaluation 5 | Evaluation 6 | Evaluation 7 | Evaluation 8 | Evaluation 9 |
|---|---|---|---|---|---|---|---|---|---|---|---|---|---|---|---|
| Example 1 | 29.3 | 87.0 | 84.8 | 25.5 | 50.7 | 59.8 | VG | VG | VG | VG | VG | VG | VG | VG | VG |
| Example 2 | 37.6 | 87.0 | 84.5 | 32.7 | 49.0 | 58.0 | VG | VG | VG | VG | VG | VG | VG | VG | VG |
| Example 3 | 44.0 | 64.0 | 88.8 | 28.3 | 69.0 | 77.7 | VG | G | VG | G | VG | G | G | VG | VG |
| Example 4 | 42.7 | 60.7 | 85.2 | 25.9 | 47.3 | 55.5 | VG | G | VG | G | VG | VG | G | VG | VG |
| Example 5 | 51.7 | 61.1 | 84.8 | 31.6 | 50.0 | 59.0 | VG | F | VG | G | VG | VG | VG | VG | VG |
| Example 6 | 21.7 | 99.1 | 85.3 | 21.5 | 46.5 | 54.5 | VG | F | F | VG | VG | VG | G | VG | VG |
| Example 7 | 25.3 | 101.2 | 88.6 | 25.6 | 62.0 | 70.0 | VG | VG | VG | VG | VG | VG | G | VG | VG |
| Example 8 | 27.2 | 96.0 | 77.5 | 26.1 | 39.5 | 51.0 | VG | VG | VG | VG | VG | VG | VG | VG | VG |
| Example 9 | 32.4 | 108.0 | 74.0 | 35.0 | 38.5 | 52.0 | VG | VG | VG | G | VG | VG | G | VG | VG |
| Comparative Example 1 | 23.1 | 113.9 | 82.6 | 26.3 | 45.0 | 54.5 | VG | G | VG | F | VG | VG | VG | VG | B |
| Comparative Example 2 | 42.7 | 58.3 | 95.6 | 24.9 | 76.0 | 79.5 | VG | G | G | F | VG | G | F | VG | B |

*Evaluation 1: thickness
*Evaluations 2 to 4: impact resistance strength 1 to 3
*Evaluations 5 to 7: shrinkage ratio 1 to 3
*Evaluation 8: haze
*Evaluation 9: drop test having been shrunk in hot water at 90° C. under the conditions of 10 seconds is designated as B2, a numerical value represented by B1/B2×100 is set to a value within a range of 70 to 90%.

2. The polyester-based shrink film according to claim 1, wherein the crystalline polyester resin is one or more selected from polyethylene terephthalate, polybutylene terephthalate, and polypropylene terephthalate.

3. The polyester-based shrink film according to claim 1, wherein the crystalline polyester resin is one or more selected from polyethylene terephthalate, and polybutylene terephthalate.

4. The polyester shrink film according to claim 1, wherein the diols consist of 50 mol % to 80 mol % of ethylene glycol, 20 to 50 mol % of neopentyl glycol or 1,4-cyclohexanedimethanol, and diethylene glycol, an amount of diethylene glycol is less than 5 mol %.

5. The polyester shrink film according to claim 1, wherein A2 of impact resistance strength is set to a value within the range of 20 to 45 J/mm; and
wherein B1 of the shrinkage ratio is set to a value within the range of 35% to 80%, and B2 of the shrinkage ratio is set to a value within the range 40% to 85%.

6. The polyester shrink film according to claim 1, wherein a film thickness before shrinking is set to a value within a range of 10 to 100 μm.

7. The polyester shrink film according to claim 1, wherein haze value of the film before shrinkage as measured according to JIS K7105 is set to a value of 5% or less.

8. A polyester-based shrink film comprising at least 90 weight % of a non-crystalline polyester resin based on the total amount of resins,
where the non-crystalline polyester resin being formed from a dicarboxylic acid comprising at least 80 mol % of terephthalic acid; and diols consisting of 60 to 80 mol % ethylene glycol and 20 mol % to 40 mol % of neopentyl glycol, and diethylene glycol, an amount diethylene glycol being 5 mol % or less,
where the film satisfying the following configurations (a) to (c):
(a) an impact resistance strength before shrinking as measured by means of a pendulum-type film impact tester is designated as A1, and A1 is set to a value within a range of 20 to 60 J/mm;
(b) an impact resistance strength measured by means of a pendulum-type film impact tester after having been shrunk by 10% in hot water at 80° C. is designated as A2, a numerical value represented by A2/A1×100 is set to a value within a range of 60% to 110%; and
(c) a shrinkage ratio in a case of having been shrunk in hot water at 80° C. under the conditions of 10 seconds is designated as B1, and a shrinkage ratio in a case of having been shrunk in hot water at 90° C. under the conditions of 10 seconds is designated as B2, a numerical value represented by B1/B2×100 is set to a value within a range of 70 to 90%.

9. The polyester shrink film according to claim 8, wherein the diols consist of 70 mol % to 80 mol % of ethylene glycol and 20 to 30 mol % of neopentyl glycol, and diethylene glycol.

10. The polyester-based shrink film according to claim 8, wherein A2 of the impact resistance strength is set to a value within the range of 20 to 45 J/mm.

11. The polyester-based shrink film according to claim 8, wherein B1 of the shrinkage ratio is set to a value within the range of 35% to 80%, and B2 of the shrinkage ratio is set to a value within the range of 40% to 85%.

12. The polyester-based shrink film according to claim 8, wherein a film thickness before shrinking is set to a value within a range of 10 to 100 μm.

13. The polyester-based shrink film according to claim 12, wherein a stretch ratio in an MD direction of the film before shrinking is set to a value within a range of 100% to 200%.

14. The polyester-based shrink film according to claim 8, wherein a stretch ratio in a TD direction of the film before shrinking is set to a value within the range of 300% to 600%.

15. The polyester-based shrink film according to claim 8, wherein a haze value of the film before shrinking as measured according to JIS K7105 is set to a value of 5% or less.

16. A polyester-based shrink film comprising at least 90 weight % of a non-crystalline polyester resin based on the total amount of resins,
where the non-crystalline polyester resin being formed from a dicarboxylic acid comprising at least 80 mol % of terephthalic acid; and diols consisting of 70 mol % to 80 mol % ethylene glycol and 20 mol % to 30 mol % of 1,4-cyclohexanedimethanol, and diethylene glycol,
where the film satisfying the following configurations (a) to (c):
(a) an impact resistance strength before shrinking as measured by means of a pendulum-type film impact tester is designated as A1, and A1 is set to a value within a range of 20 to 60 J/mm;
(b) an impact resistance strength measured by means of a pendulum-type film impact tester after having been shrunk by 10% in hot water at 80° C. is designated as A2, a numerical value represented by A2/A1×100 is set to a value within a range of 60% to 110%; and
(c) a shrinkage ratio in a case of having been shrunk in hot water at 80° C. under the conditions of 10 seconds is designated as B1, and a shrinkage ratio in a case of having been shrunk in hot water at 90° C. under the conditions of 10 seconds is designated as B2, a numerical value represented by B1/B2×100 is set to a value within a range of 70 to 90%.

17. The polyester shrink film according to claim 16, wherein an amount of diethylene glycol being 5 mol % or less.

18. The polyester shrink film according to claim 16, wherein A2 of impact resistance strength is set to a value within the range of 20 to 45 J/mm; and
wherein B1 of the shrinkage ratio is set to a value within the range of 35% to 80%, and B2 of the shrinkage ratio is set to a value within the range 40% to 85%.

19. The polyester shrink film according to claim 16, wherein a film thickness before shrinking is set to a value within a range of 10 to 100 μm.

20. The polyester shrink film according to claim 16, wherein haze value of the film before shrinkage as measured according to JIS K7105 is set to a value of 5% or less.

* * * * *